June 7, 1966 L. M. PUSTER 3,254,670
CONTROLLER INDICATOR AND CONTROLLER INDICATING SYSTEM
Filed Nov. 15, 1963 7 Sheets-Sheet 7
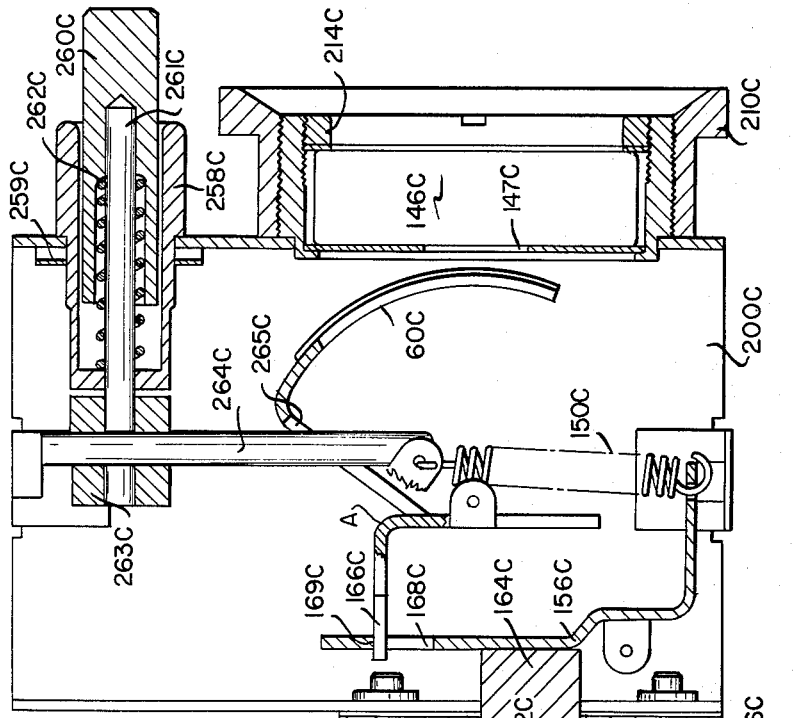
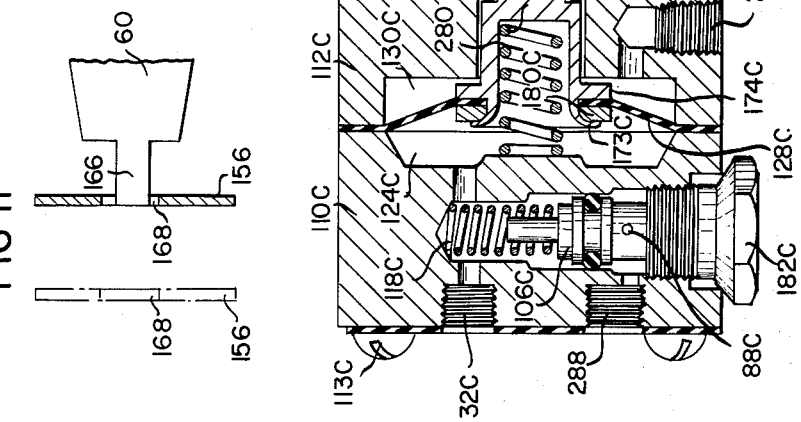
INVENTOR.
LOUIS M. PUSTER
BY
HIS ATTORNEYS United States Patent Office 3,254,670
Patented June 7, 1966

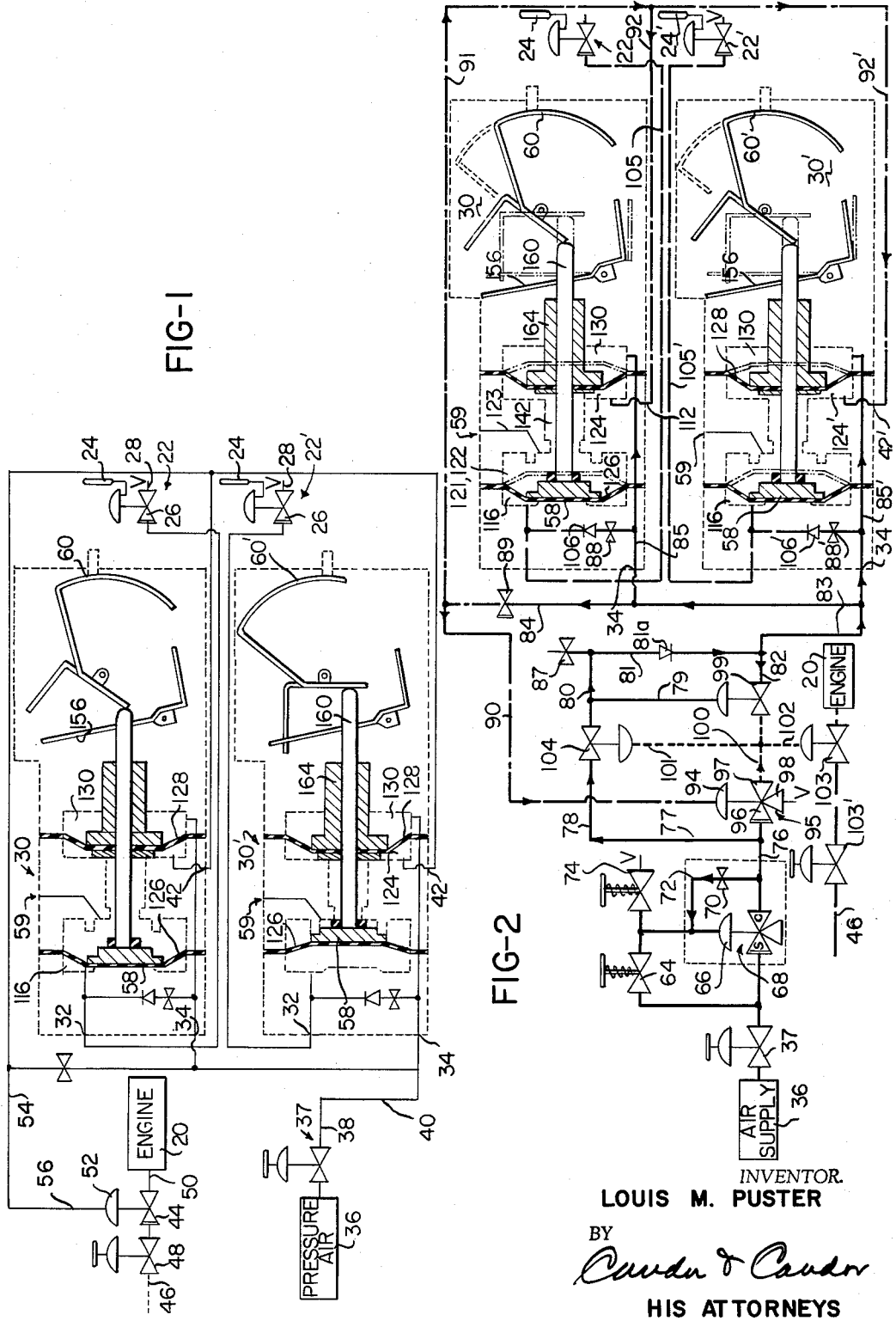

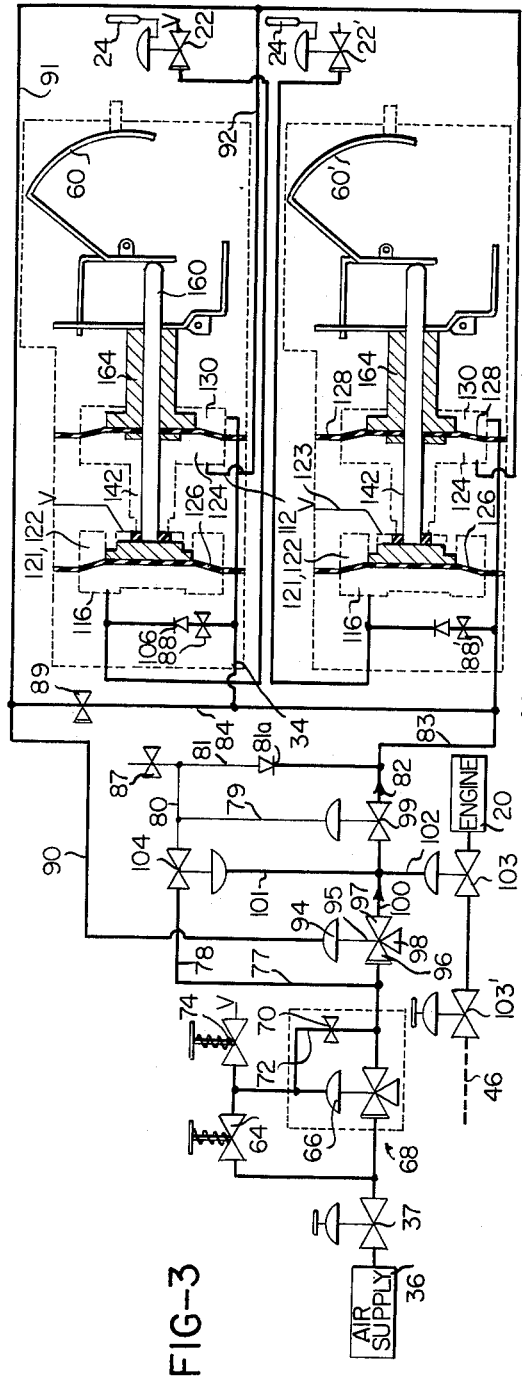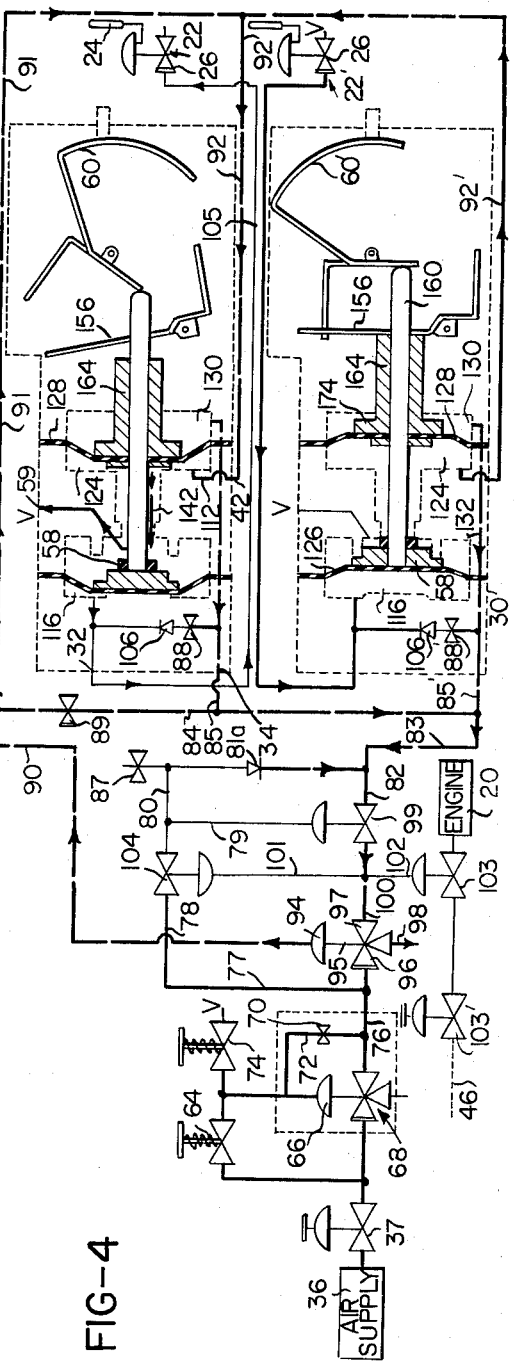

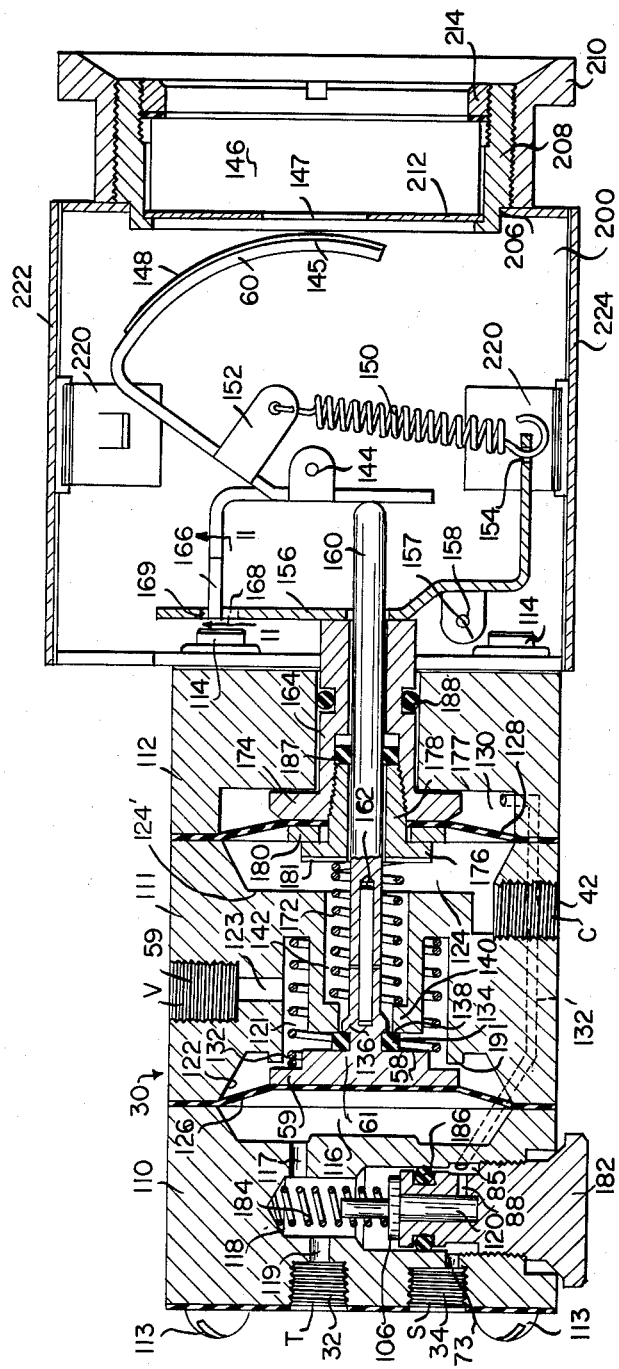

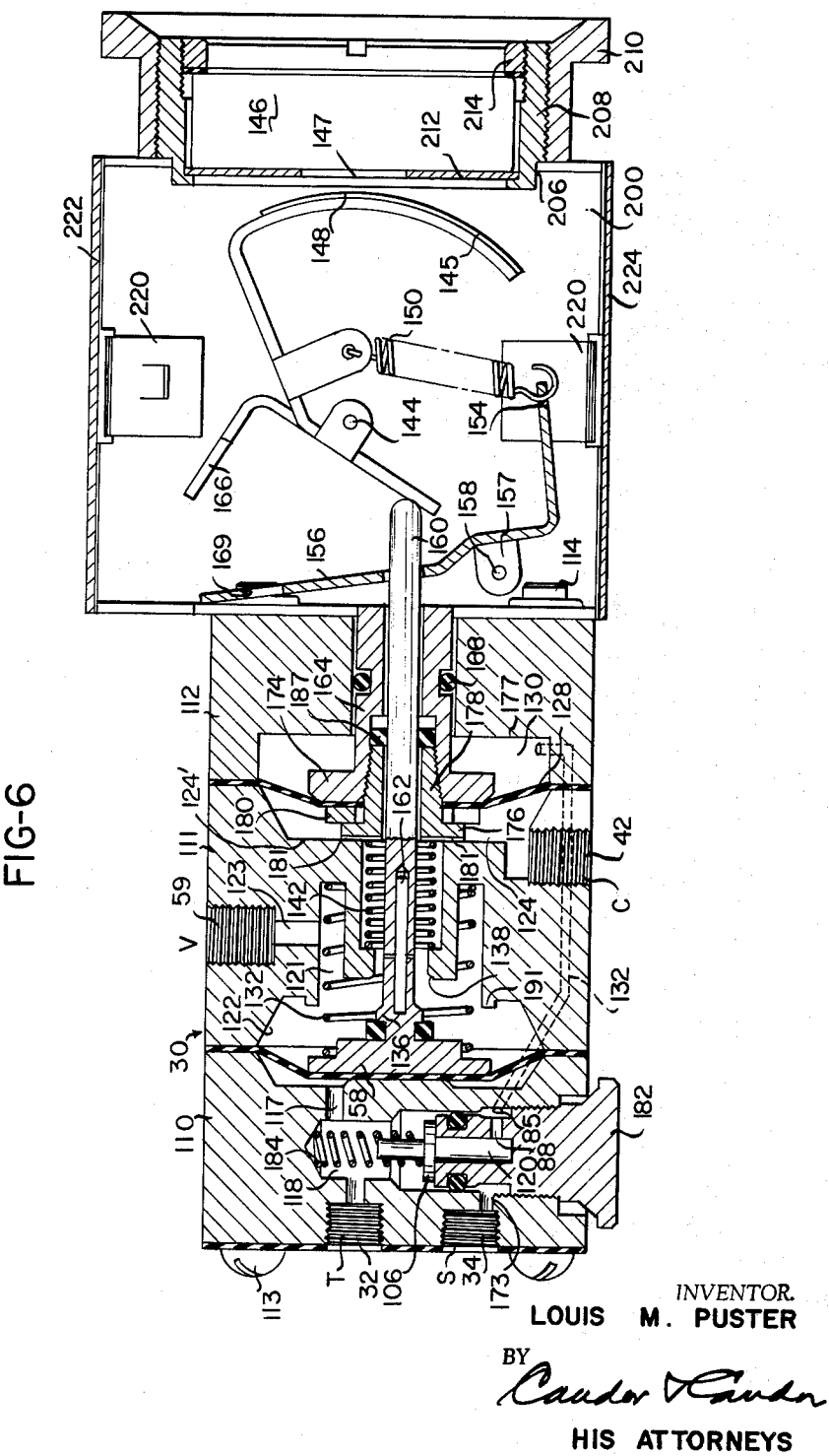

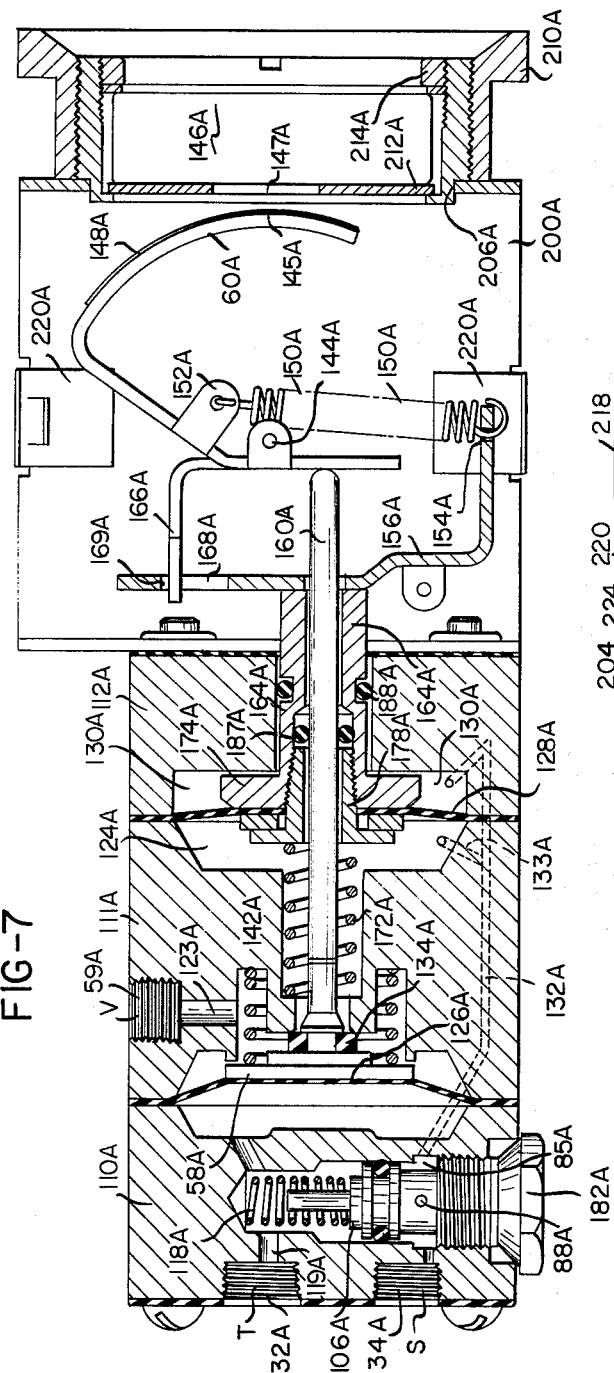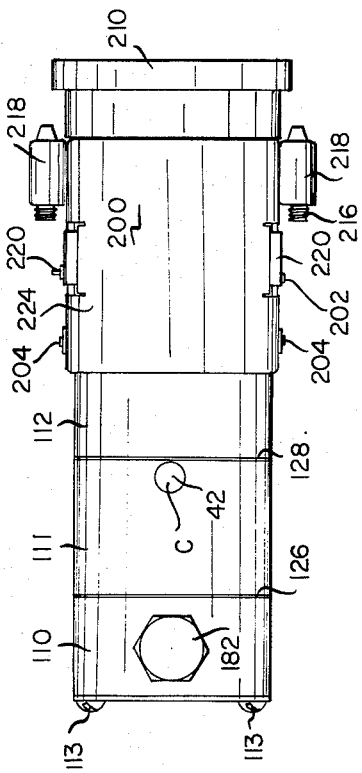

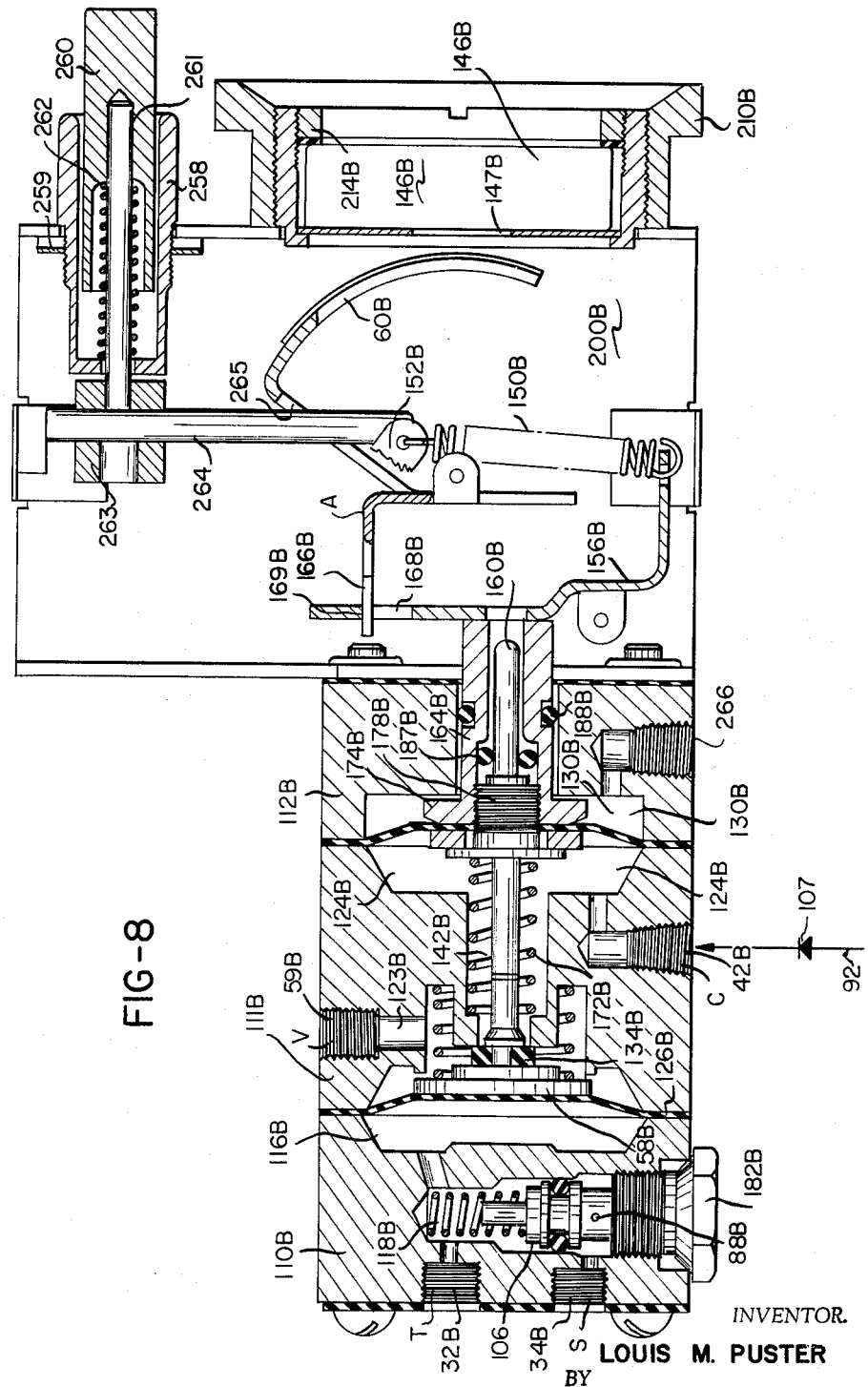

3,254,670
CONTROLLER INDICATOR AND CONTROLLER
INDICATING SYSTEM
Louis M. Puster, Knoxville, Tenn., assignor to Robertshaw Controls Company, Richmond, Va., a corporation of Delaware
Filed Nov. 15, 1963, Ser. No. 323,977
21 Claims. (Cl. 137—557)

This invention relates to a controller indicator and controller indicating system.

A controller indicator system embodying this invention controls a device to be controlled, such as an internal combustion engine, and stops or otherwise varies its operation when a variable condition produced by the operation of such device becomes undesirable or unsafe, and retains an indication of such condition.

The system may also include a plurality of controller indicators responsive to a plurality of different variable conditions of operation of the engine and the like, any one of which is capable of stoppeng the engine when the particular condition to which it is responsive becomes unsafe. The particular controller indicator which stops the engine is also capable of recording the cause of the engine stoppage, such as an unsafe indication of an overheated condition, or an overspeed condition, even if such condition falsely appears safe when the engine has been stopped.

Controller indicators and indicators of this invention are of such a character that they may be manufactured in an efficient manner.

The controller indicator casing may be made of an improved stacked block construction between which pressure responsive members may be secured and connected to valve and indicating means in an efficient and economical manner.

Other features of this invention are apparent from this description, the appended claimed subject matter, and the accompany drawings, in which:

FIGURE 1 is a diagrammatic illustration of a system including a device to be controlled, a simplified pressure fluid supply, a plurality of transmitters responsive to variable conditions in said device, and a plurality of controller indicators connected to said device, said transmitters and said fluid supply.

FIGURE 2 is a diagrammatic illustration of a more detailed and automatic fluid system than is shown in FIGURE 1, in a starting stage just after the system has been energized to start a device to be controlled, such as an internal combustion engine.

FIGURE 3 is a view similar to FIGURE 2 showing the system in normal operating condition subsequently to the starting stage shown in FIGURE 2.

FIGURE 4 is a view similar to FIGURE 3 showing the system being stopped by reason of an unsafe variable condition of the device being controlled, such as an engine.

FIGURE 5 is a cross section of one of the controller indicators in the normal operating stage shown in FIGURE 3.

FIGURE 6 is a view similar to FIGURE 5 but showing the controller indicator with the indicator in the stage of the upper controlller indicator of FIGURE 4.

FIGURE 7 is a view similar to FIGURE 5 but showing an instrument which provides indication only without the control features.

FIGURE 8 is a view similar to FIGURE 4 but showing an instrument with a manual reset.

FIGURE 9 is a view somewhat similar to FIGURE 7 but showing a manually reset instrument for indication only.

FIGURE 10 is a side view of FIGURE 5.

FIGURE 11 is a detail cross section along line 11—11 of FIGURE 5.

A system, according to this invention, may include a device 20 to be controlled, which may be an internal combustion engine, for example.

The device to be controlled may have a plurality of variable conditions produced during its operation. If it is an internal combustion engine these variable conditions may be engine temperature, such as the cooling system temperature, speed of operation, and the like. Each of these may be in a safe condition and an unsafe condition. In other instances, these variable conditions may vary between certain limits which need not be "safe" and "unsafe" but which are to be maintained at a desired limit or zone.

A plurality of transmitters 22, 22', etc., may be connected to the device or engine 20 with each transmitter having a suitable sensing element 24 which is suitable to sense the particular condition being sensed. The transmitters may be responsive to open a vent valve 26 when its respective condition becomes unsafe or of an undesired characteristic. If desired such valve may discharge or vent the pressure fluid into the atmosphere at 28.

At times when describing a plurality of similar members, a prime ('), a ditto ("), etc., may be used to indicate a particular one or more member or members when it is desirable to indicate which particular one is being distinguished from others. However, when general description of the group of members is being given, only the main numeral may be used, to avoid cumbersome description.

A plurality of controller indicators, such as 30, 30', etc., may be provided. One for each transmitter 22, 22', etc., may be properly connected to such transmitters. To this end, each controller indicator may have a transmitter port 32 connected to the vent valve 26 of its respective transmitter.

Each controller indicator 30, 30', etc., may have an instrument or pressure fluid supply port 34 connected to a source 36 of instrument or pressure fluid, such as a compressed air supply, which may be controlled in any suitable manner. For example, a manual, pressure discharge adjusting valve 37 may be provided which discharges such compressed air at 38, and by any suitable connections 40 may be connected and supply the supply ports 34 with compressed air of the desired pressure as determined by the setting of valve 37.

Each controller indicator 30, 30', etc., may have a control port 42 which may be connected to a control member 44 of said device 20 to be controlled. In the case of an internal combustion engine, such control member 44 may be a fuel control valve which controls the flow of fuel from the fuel supply 46 to the engine. The fuel supply 46 may be a gas supply line or a connection thereto, as desired. A manual control valve 48 may be included in the fuel supply line 50, by which a manual control (and pressure control, if desired) is provided in series with the valve 44. The valve 44 may be an on and off valve which is opened when fluid under pressure is provided at expansible chamber 52 by control fluid line 54 and suitable intermediate connections 56. The valve 44 may be closed to stop the engine 20 when such fluid under pressure is vented or reduced in pressure, if desired.

Each controller indicator 30, 30', etc., may have fluid control means such as vent valve means 58 and vent port 59 to cause fluid in its control port 42 to stop the device or engine 20 under the control of its respective transmitter 22.

Each controller indicator 30, 30', etc., may have respective indicator means 60, 60', etc., all of which show safe condition signals when all of the respective transmitters 22, 22', etc., sense a safe or desired variable condition and which cause its respective indicator means such as 60, FIGURE 1, to show an unsafe or undesired condition signal, such as red, when its respective transmitter, such as 22, senses an unsafe or undesired condition while the controller indicators, such as 30' and others which have respective transmitters such as 22' and others, sensing a safe or desired condition maintain their indicator means, such as 60' and others, showing safe or desired condition signals, such as green signals. These indicators maintain their respective indications such as red at 60 and green at 60' for example even after the source of fluid under pressure 36 has been cut off from said supply ports 34, either manually as at 37 or automatically as elsewhere described.

In FIGURE 1 the controller indicator 30 is shown with its parts in the positions which caused them to stop the engine 20. The transmitter 22 of controller 30 has sensed an overheated engine 20 by its sensor 24 which has opened the transmitter valve 26 and has vented the transmitter port 32 of controller 30. This has also opened vent valve 58 and has connected control port 42 and vent port 59 of controller 30. This has reduced the air pressure in air lines 54 and 56 and in chamber 52 and has closed engine fuel valve 44 to stop the engine 20.

The indicator 60 of controller 30 has been tripped to red indication because both diaphragms 126 and 128 have been moved leftward to allow latch 156 to release the indicator 60 to assume the position of FIGURE 6.

In the meantime the controller 30' retains its indicator 60' with safe or green indication. This is accomplished because the diaphragm 126 is retained in its right position since transmitter 22' is not vented. Diaphragm 126 maintains plunger 160 in its right position to hold indicator 60' in green position, as later to be described.

This is a brief description of the general action which takes place in the simple system shown in FIGURE 1. However, there are other details which may be used in the system which are shown in FIGURES 2–6. The description which follows in connection with these FIGURES 2–6 will give further details of the operation of the system.

To start the engine 20 of FIGURE 2 the operator may open air supply valve 37. He then pushes open the self closing start valve 64. This pressurizes expansible chamber 66 and opens starting relay valve 68 between s and c. The start valve 64 is held open long enough to permit orifice 70 to maintain a holding pressure in line 72 to hold valve 68 open after start valve 64 has been closed. The system also permits closing valve 74 to vent the chamber 66 to close valve 68 when it is desired manually to stop the system with valve 74.

The pulse relay 104 herein disclosed may be similar in construction and operation to the pulse relay 10 which is disclosed in U.S. Patent No. 3,075,537 to L. M. Puster, patented January 29, 1963. Several other components disclosed in this application are somewhat similar to components in said patent, as will be recognized by those skilled in this art.

Opening of valve 68 pressurizes pipe sections 76 to 81, FIGURE 2, against the restricting actions of orifice 87 and of a lightly loaded check valve 81a. Pressurizing section 79 closes lockout valve 99. Pipe sections 82, 83, 84, 85 and 85' are then pressurized against the restricting actions of orifices 88, 88' and 89, and closed lockout valve 99.

The sections thus far pressurized are shown in heavy lines.

Restricted flow through orifices 88, 88' pressurizes transmitter lines 105 and 105' (as shown in long dash lines) and chambers 116. This assumes that transmitter valves 22 and 22' are closed. If the valves 22 and 22' are not closed, no further action will take place and the operator is thereby informed that one or more unsafe conditions exist and must be rendered safe before the engine gas valve 103 can open to start the engine. The system therefore checks itself for unsafe conditions before the engine can be started.

If all the conditions are safe, and the transmitter lines 105 and 105' and chambers 116 have been pressurized, the diaphragms 126 will move rightward to the dotted line positions to close vent valves 58, to move the plungers 160 rightward and to move the indicators 60 and 60' to safe or green positions, as shown in dotted lines.

Closing of vent valves 58 permits pressurization of pipe sections 90, 91, 92 and 92' and chambers 124 and 124' through orifice 89, as indicated by short and long dash lines 90, 91, 92 and 92' and by the dotted position of diaphragms 128 and plungers 164. Such parts assume the normal operating positions shown in FIGURES 3 and 5.

Pressurizing of pipe section 90 pressurizes valve chamber 94 of master relay 95 and opens master relay valve inlet 96 to outlet 97 and closes vent 98. This pressurizes pipe sections 100, 101 and 102, as indicated in heavy short dash lines which closes pulse relay 104 (operating in the same manner as valve 30 of the Puster patent) and opens safety shutdown valve 103 to introduce fuel into engine 20, as manual fuel valve 103' has been previously opened to connect fuel supply 46 to the system. This causes the engine 20 to start.

Before normal pressurization of the system the indicator 60, FIGURE 2, might show an unsafe condition due to a previous unsafe operation of the engine, which has now been repaired. The indicator 60' may have shown a safe condition, as shown in dotted lines in FIGURE 2, but it might flicker to unsafe indication, as shown in full lines, FIGURE 2, during pressurization.

The system is then pressurized for normal operation of the engine 20 as shown in FIGURE 3, the pressurized pipe sections being shown in heavy lines. The closed pulse relay 104, vent orifice 87 and check valve 81a maintain pipes 79, 80 and 81 depressurized. Depressurized pipe 79 opens lockout valve 99 to permit pressure fluid to flow along pipes 100 and 82. It is assumed that all the variable conditions are safe or desirable, so the transmitters 22, 22', etc., are not vented. Under these conditions both of the indicators 60, 60' and others, if used, show safe or desirable condition signals. The system and engine can then continue under normal operation until a variable condition becomes unsafe to establish the system shutdown conditions of FIGURE 4.

In FIGURE 4 the transmitter 22 has sensed an unsafe or undesired condition, and has vented valve 26 and transmitter connection 105 and transmitter port 32. This, in turn, has opened valve means 58 in a manner more fully described elsewhere, and has connected control port 42 to vent port 59 and has started a depressurizing or venting action in pipe lines 90, 91, 92 and 92' toward open vent port 59, as indicated by heavy dotted lines and arrows. This soon depressurizes expansible chamber 94 and connects valve port 97 to vent port 98. This quickly produces a depressurizing or venting action toward vent port 98 in pipe sections 100, 101, 102, 82, 83, 84, 85 and 85'. This closes engine shut-down valve 103 and stops engine 20.

The indicator 60' of controller 30' is maintained in safe or green position, in FIGURE 4 by check valve 106. This check valve 106 is used to create a delayed action on the "safe" indicator 60' (and similar "safe" indicators, if used) to prevent false "unsafe" signalling by such indicators. Since check valve 106 maintains pressure for a moment after shutdown in chamber 116 to keep vent valve 58 closed (on the "safe" indicators), it physically holds the indicator 60' in the "safe" position by the rightward positions of diaphragm 126 and plunger 160 until any transient pressure on diaphragm 128, as a result of the shutdown, disappears. This transient pressure will not cause the indicator to drop to "unsafe" position since, in general, it will cause only a momentary unlatching of lever 156. However, the spring 172 of FIGURE 5 will immediately return the latch lever 156 to the latching position.

Applicant's pulse relay 104 is the same as relay 10 of the Puster patent, 3,075,537. Applicant's pipes 78, 80 and 101 correspond respectively to the patentee's pipes 100, 102 and 126 in patentee's FIGURE 5. Applicant's pipes 78, 80, and 101 are to be correspondingly connected to the ports 22, 28 and 66 of the detailed pulse relay disclosed in patentee's FIGURES 1–4.

The result is that applicant's pulse relay 104 prevents flow of pressure air from applicant's pipe section 78 and valve 68, even if applicant's pipe 101 is depressurized, for the same reasons fully explained in said Puster patent in connection with the above-identified corresponding patentee pipes 100, 102 and 126. Therefore pulse relay 104 will prevent restarting of engine 20 even if the transmitter valve 26 should be closed by the cooling of the engine or the like, as more fully explained in the said patent.

To restart the engine 20, it is necessary to depressurize valve 68, by opening stop valve 74 for example, to thereby depressurize pipes 72, 76, 77 and 78 (after repairing the unsafe engine) before the engine can be started again by pressing down on start valve 64.

When the system and engine are stopped as shown in FIGURE 4 of this application the indicator 60 of the upper controller indicator 30 is in a position to display an unsafe or undesired condition signal, such as red. The indicator 60' of the lower controller indicator 30' is in a position to display a safe or desirable condition signal, such as green. Therefore the operator is able to determine which controller indicator caused the shutdown of the engine and can make the proper repairs or adjustments on the engine before he restarts the engine. This prevents repetition of the unsafe condition and prevents possible damage to the engine. If more than two controller indicators 30, 30', etc., have been provided, and only one of these received an unsafe transmission from its transmitter 22, then only that controller indicator 30 will show red or unsafe indication at 60 and all of the rest of the controller indicators 30', etc. will show safe or green indications at 60', etc. This permits the operator quickly to locate the cause of the shutdown.

For the pressurizing actions of FIGURE 3, lockout valve 99 may be a pressure responsive valve of any type that closes connection between pipes 100 and 82 when a slight pressure is produced in pipe 79. To close lockout valve 99, the pressure in pipe 79 is required to be only of the character produced by a lightly spring pressed check valve 81a. Such check valve 81a may be provided with a slight spring action sufficient to maintain a slight pressure drop between pipes 81 and 83 when a relatively large volume of pressurized air is passing through the check valve 81a, such as during the initial pressurizing of the system when the engine 20 is being started. This insures the closing of lockout valve 99 before any substantial amount of pressure air is discharged out of temporarily connected open ports 97 and 98 of relay valve 95. However, the check valve 81a, will prevent any substantial flow of air from pipe 83 to pipe 81 when the lockout valve 99 has been opened and after master relay 95 has been pressurized to connect ports 96 and 97 and to disconnect vent port 98 from both the ports 96 and 97.

If desired, lockout valve 99 may be a valve substantially as disclosed in said Puster patent, 3,075,537, but used as a lockout valve with the patent ports 66, 22 and 28 connected respectively to pipes 79, 82 and 100 of this application.

FIGURES 5 and 6 show how details of the controller indicators 30 and 30' cooperate with the control systems of FIGURES 1–4 as is further described in connection with such FIGURES 5 and 6.

In FIGURE 5, a control means or controller indicator corresponding to controller indicators 30, 30', etc., of FIGURES 1–4, is shown with a casing means which may include the blocks 110, 111 and 112 which may be flat, substantially rectangular parallelepipeds, if desired, and which are held together by the bolts 113 and lock nuts 114 near the corners of such blocks. Such control or casing means may have a supply port 34, a transmitter port 32, a vent port 59 and a control port 42. The control or casing may also have a transmitter port cavity 116 connected to said transmitter port 32 by the passageways 117, 118 and 119. The control or casing may also have a supply port cavity 130 connected to the supply port 34 by a relatively unrestricted passageway 132 and by annular channel passage 85. The control or casing may also have a supply restrictor passageway 88 also connected to supply port 34 by annular channel passageway 85 and controlling supply fluid or air flow from the supply port 34 to the transmitter port 32 and to the cavity 116. The fluid may flow through the passageway 120 past the check valve 106 into the passageway 118 and from there to the transmiter port 32 and the cavity 116.

A vent port cavity 121, 122 may be formed by the cylinder part 121 and the flared part 122. The vent port cavity 121, 122 may be connected to the vent port 59 by the passageway 123. A control port cavity 124 may be connected to the control port 42.

A transmitter port pressure responsive means, diaphragm, or fluid impervious flexible member 126 may separate the transmitter port cavity 116 and the vent port cavity 122, 121.

A control port pressure responsive means, diaphragm, or fluid pressure impervious flexible member 128 may separate the control port cavity 124 and the supply port cavity 130.

The flexible members or diaphragms 126 and 128 may be secured and sealed at their edges between the blocks 110, 111 and 112.

A vent valve means 58 may be operated by the transmitter port pressure responsive diaphragm 126 in combination with the pressure of the compression spring 132. A flexible ring seal 134 may be held between the main body of the valve 58 and a valve stem head 136.

The valve means 58 and its seal 134 may connect and disconnect the vent port cavity 121 and the control cavity 124. The seal 134 may seal and unseal at the valve seat 138 which is formed at an edge of the cylindrical wall 140 which separates the cylindrical part 121 of the vent cavity and the cylindrical part 142 of the control cavity 124.

The indicator or indicator lever 60 may be pivoted on the pivot pin 144 and may have a "safe," desired or green signal at 145 which is displayed at opening 147 and through the transparent glass or plastic window 146 when the respective transmitter 22 senses a safe condition. The indicator 60 also may have an "unsafe," undesired or red signal at 148 which is displayed through the opening 147 and window 146 when the indicator 60 is in the full line position of FIGURE 6.

The indicator lever 60 is biased in a clockwise direction by the tension spring 150 which is attached to an ear 152 of the indicator 60 and to an eye 154 of the indicator latching means or lever 156. The latching lever 156 is pivoted by ear 157 on the pivot pin 158.

The indicator lever 60 is actuated clockwise by an indictator actuator or plunger 160 in response to positioning of the diaphragm 126. The plunger 160 is firmly secured to the valve stem 136 by a roll pin 162 and moves in unison with the valve means 58.

The indicator lever 60 is pivoted to its full line "safe" position of FIGURE 5 when the valve means 58 and plunger 160 have been moved to their rightmost position (of FIGURE 5) when diaphragm 126 has been pressurized by pressure air from supply port 34 which is blocked by a closed transmitter valve 26 when its respective transmitter 22 senses a "safe" condition.

The indicator lever 60 may be latched in the full line position of FIGURE 5 by the latching means or lever 156. A latching means actuator or plunger 164 engages the latching lever 156 and rocks it about the pivot pin 158. The full line position of lever 156 in FIGURE 5 is the clockwise rocking limit of such lever 156, and in this position it latches the end of tongue 166 of indicator lever 60. The tongue 166 enters a slot 168 in lever 156, so the lever 60 is prevented from rocking clockwise by engagement of tongue 166 with the edge 169 of the slot 168.

If the latching lever 156 is held in its full line position of FIGURE 5, by the action of spring 172 the indicator lever 60 will also be held in its full line "safe" position of FIGURE 5 even if the valve 58 and plunger 160 are moved leftwardly when transmitter chamber 116 is depressurized. This occurs, for example, under the conditions illustrated for the lower controller indicator 30' in FIGURE 4. Previously in FIGURES 4 and 5, the plunger 160 had moved lever 60 to the "safe" condition by fluid pressure in cavity 116 because the lower transmitter 22' senses a safe condition, and maintains its valve 26 closed. At the same time the plunger 164 had been moved to its most rightward position of the lower controller 30' of FIGURES 4 and 5 by fluid pressure in cavity 124 which had moved diaphragm 128 rightward, since the diaphragm 128 is attached to the head 174 of plunger 164. However, if cavity 116 later should be depressurized by slow leaks past check valves 106, the diaphragm 116, valve 58 and plunger 160 may be moved leftward. However, the indicator lever 60' will remain locked in "safe" position by the latching lever 156 and the plunger 164 in their most rightward positions when they are retained by the action of spring 172 which is strong enough to maintain them in their rightward positions when the air pressure is lost in chambers 124 and 130.

The compression spring 172 biases the diaphragm 128 rightward when cavities 124 and 130 are equalized in pressure, as in the lower controllers 30' of FIGURE 1 or as in FIGURE 3. However, the spring 172 is not sufficiently strong to resist leftward movement of diaphragm 128 when the cavity 124 is depressurized and the cavity 130 is pressurized, as in FIGURES 2 and 6.

The diaphragm 128 is held by the plunger 164 between the plunger head 174, the head 176 of an externally threaded nut 178, and a washer 180. The head 176 is made so it cannot produce a seal between cavity ports 124 and 142. This may be accomplished if the diaphragm 128 does not limit the leftward movement of head 176 sufficiently, by providing suitable grooves or fluting or the like 181 on the left surface of head 176.

The orifice 88 is formed in a removable plug 182 which also contains the passageway 120. Its end receives the check valve 106 which is lightly biased by compression spring 184. An offset in plug 182 forms the annular passageway 85 which is connected to supply port 34 by passageway 173.

Sealing rings are provided at 186, 187 and 188.

The indicator housing 200, FIGURES 5 and 10, provides means for mounting the entire assembly on a panel or other supporting device, not shown. Suitable holes are provided through which the pivot pins 144 and 158 are mounted and held in place by retainer nuts 202 and 204, FIGURE 10. An opening 206 is provided in the housing 200 in which the threaded boss 208 is secured and to which escutcheon 210, window frame 212, window 146 and lock ring 214 may be attached. With the escutcheon 210 removed, the threaded boss 208 is inserted through an opening in a panel, not shown. The escutcheon 210 is then reassembled with its flange on the other side of the panel. Jack screws 216 are threaded through elongated nuts 218 which are welded on the side of the housing 200. The assembly is locked in place on the panel or mounting board, not shown, as the jack screws 216 are tightened. Notches are provided at the top and bottom of housing for assembly of the sheet metal clips 220 which provide means of attaching the housing covers 222 and 224.

Indication only

Another embodiment is shown in FIGURE 7 which operates functionally in the same manner except that it provides indication only. That is, when pressure is supplied at port 34A, the transmitter connected at the transmitter port 32A becomes unsafe, the indicator lever 60A indicates red or unsafe. However, the engine safety system is not affected or shut down. If the transmitter returns to a safe condition, the embodiment of FIGURE 7 will indicate green. Therefore, it has no need for a control connection 42. To make plunger 164A operate latching lever 156A in same manner as described previously, diaphragm cavity 124A needs to be supplied with an air signal similar to the previous embodiment. This is accomplished with a cross drilled passageway which serves as a restrictor orifice 133A in body section 111A connecting passageway 132A (supply) with diaphragm cavity 124A.

Therefore, in operation with supply port 34A pressurized and transmitter connection 32A blocked, stem 160A rotates indicator lever 60A in a counterclockwise direction to indicate a green or safe signal. At the same time, supply pressure is transmitted hrough passageway 132A to both sides of diaphragm 128A which cancels the pressure effect on this diaphragm and spring 172A forces plunger 164A to rotate the latching lever 156A in a clockwise direction so that the extended tongue 166A is engaged with slot 168A of the indicating lever 60A and latching lever 156A respectively.

In the event that the associated transmitter becomes unsafe, plunger 160A retracts and valve 58A vents cavity 124A (air to cavity 124A is restricted by orifice 133A) and the pressure in diaphragm cavity 130A forces plunger 164A to retract and latching lever 156A rotates in a counterclockwise direction disengaging tongue 166A from slot 168A and spring 150A rotates indicating lever 60A to a red or unsafe condition. Since this embodiment cannot vent the actuating diaphragm of safety system master relay section of FIGURES 2–4, it will not cause the safety system to initiate an engine shutdown.

As described in connection with the first embodiment, action of plunger 160A serves as a means of automatically resetting the indicator lever 60A, and latching lever 156A serves as a means of retaining the existing signal when supply pressure is lost, giving the devices described above a "memory" that the connected engine function was not unsafe.

Manual reset

Another embodiment of a receiver indicator is shown in FIGURE 8. This receiver is basically the same as shown in FIGURES 5, 6 and 10, and performs the same functions except that provisions are made for manual reset instead of automatic reset of indicator lever 60B. The indicator housing 200B is made longer to provide for a reset button assembly which is fastened to the window 146B side of the housing 200B. The reset button assembly is made up of a spring housing 258 which is assembled through indicator housing 200B and held in place with a lock nut 259 and a shoulder on spring housing 258. The enlarged section is sufficiently long to extend through the panel or supporting plate for the indicator assembly. A push button 260 is assembled through the center of spring housing 258 and is provided with a counterbore to serve as a spring seat and a second counterbore into which is pressed a roll pin 261. The bottom of spring housing 258 serves as a seat for spring 262 and is provided with an opening through which roll pin 261 is closely guided. A sleeve 263 is pressed on the end of roll pin 261 which serves as a stop preventing spring 262 from forcing push button 260 out of spring housing 258. A roll pin 264 is pressed into a cross drilled hole in sleeve 263 and extends into an opening 265 in indicator lever 60B. Therefore, if indicating lever 60B is in the red or unsafe condition, the push button 260 can be depressed which causes roll pin 264 to contact indicator lever 60B and rotate it counterclockwise to latch in the green position by means of the extended tongue 166B and slot 168B as described above. When reset button is released, spring 262 returns the reset button to its original position and the indicator lever 60B is free to trip to the red or unsafe position as dictated by its associated transmitter.

With a receiver indicator of FIGURE 8 with manual reset provision, it is also necessary to supply the transmitter and diaphragm cavity 116B with an independent source of air at port 34B. Therefore, another supply port 266 is provided which feeds diaphragm cavity 130B and is the same supply associated with the engine safety system as described in FIGURES 2-4. The independent air supply applied at port 34B is initiated a sufficient time before air is supplied to the basic safety system (and port 266) to pressurize the line to the transmitter and diaphragm cavity 116B. The reason for this requirement is to eliminate "flicker" to red position of indicator 60' due to the pressurization of the system is described in connection with FIGURE 2 of the first embodiment. The independently, previously pressurized cavity 116B holds the valve 58B closed and prevents venting of cavity 124B and consequent unlatching and "flicker" to red of lever 60B. If the manual reset embodiment as shown on FIGURE 8 were allowed to "flicker," each indicator would have to be manually reset even though its corresponding transmitter 22 is in a safe condition during initial pressurization. With the early independent air supply to the transmitter circuit at port 34B and the regular supply fed later to port 266, passageway 132 of the first embodiment is eliminated. Also plunger 160B is shortened so that it cannot contact indicating lever 60B. This embodiment has a control port 42B and vent port 59B and, in conjunction with the valve 58B is capable of venting the control pressure to a safety system to stop an engine 20 and the like in a manner such as shown in FIGURES 1-4. However, the lines 92 of FIGURES 1-4 are connected to control ports 42B to hold the pressure in diaphragm cavity 124B and to hold plunger 164B against latch 156B until after the pressure at port 266 is lost. Check valve 106 serves to prevent vent valve 58B from exhausting cavity 124B too rapidly. This maintains indicator 60B in "safe" position when the line 92 has been vented by some other indicator unit and its transmitter.

*Manual reset indication only*

Another embodiment of a receiver indicator is shown in FIGURE 9, which is a combination of features of the two embodiments disclosed in FIGURES 7 and 8. This embodiment is provided with manual reset and is capable of indication only. Therefore, a valve, such as 58, and a plunger such as 160 are not needed. With the elimination of the need of these components, body section 111 is no longer needed. Body sections 110C, 112C, similar to body sections 110 and 112, and indicator housing 200C similar to indicator housing 200 are assembled with the four bolts 113C. Plunger 164C is made with a central cavity 280 to serve as a spring seat for return spring 172C, and diaphragm 128C is attached to plunger 164C by staking a raised shoulder 173C securely over washer 180C thus entrapping the diaphragm between the diaphragm shoe portion 174C of plunger 164C and washer 180C.

In operation, the embodiment of FIGURE 9 has an independent transmitter supply 288 in body section 110C and a safety system supply 266C in body section 112C as described in connection with FIGURE 8. Therefore, with independent air supply first admitted to port 288 so that the transmitter and connected tubing is pressurized before air is supplied to port 266C from a system such as disclosed in FIGURES 1-4, the indicator lever 60C will not "flicker" red, thereby eliminating the need for manually resetting the indicator on each "start-up." If a "red" signal should exist after the transmitter is in a safe condition and the system pressurized, indicator lever 60C is rotated to the green or safe position by depressing reset button 260C, in a manner similar to FIGURE 8. With the associated transmitter, such as 22, not venting (in a safe condition), equal pressure exists in diaphragm cavities 130C and 124C canceling pressure effect on diaphragm 128C so that return spring 172C rotates latching lever 156C in a clockwise direction permitting extended tongue 166C to engage slot 168C. Therefore, when the reset button 260C is released, a green or safe signal will be displayed through window 146C.

As in the case of the other embodiments, if the transmitter 22 connected to the unit of FIGURE 9 becomes unsafe or vents, pressure is reduced sufficiently in diaphragm cavity 124C due to restrictor orifice 88C to cause pressure in diaphragm cavity 130C to overcome load exerted on diaphragm 128C by load spring 172C and retract plunger 164C. With plunger 164C retracted, tension spring 150C is of sufficient strength to disengage extended tongue 166C from slot 168C and to rotate indicator lever 60C clockwise to the red or unsafe position giving a true indication of the unsafe condition of the associated transmitter 22. This embodiment is not capable of venting the control pressure of a safety system, such as shown in FIGURES 2-4, and hence does not control the stopping of the engine 20.

The operation of the embodiment of FIGURES 5, 6, 10 and 11, of the controller indicator 30, as applied to systems such as disclosed in FIGURES 1-4 is as follows.

Instrument quality air, such as from pipe 83 of FIGURES 2-4, is supplied through supply port 34 which is in direct communication with passageways 173, 85 and 132. Passageways 173 and 85 lead to restricted orifice 88 located in orifice plug 182 and instrument or pressure air is free to flow through passageway 120 and through the free flow direction of small check valve 106 which is held lightly on its seat by means of check valve spring 184. From the check valve, air is free to flow through passageways 118 and 119 to transmitter port 32 and through passageways 118 and 117 to diaphragm cavity 116. With transmitter port 32 blocked by a safe transmitter 22 of FIGURES 2-4, to prevent loss of air, pressure builds up in cavity 116, and diaphragm 126 is forced against valve means 58 which is moved rightwardly to overcome load spring 132.

Throughout this application, for the sake of brevity, certain words are used to indicate direction, relative position, etc., such as "rightward," "upward," "leftward," "downward," etc. It is to be understood however, that such words are used for convenience and brevity as applied to the drawings of this application, and that the parts so described in actual embodiments for actual use, or in other drawings, may have different directions and relative positions.

Valve means 58 is made with a reduced section 59 to form a shoulder to provide a spring seat for spring 132. The valve means 58 also has an extended reduced section 61 provided with a groove which is so fashioned to entrap the ring poppet 134. Body section 111 is formed with a central bore which serves as the valve seat 138 and in conjunction with ring poppet 134 forms a two way valve. Body section 111 is made with a diaphragm cavity 121, 122 which is connected with vent port 59. A boss 191 serves as a stop for valve 58. Therefore, as valve 58 moves rightward to overcome compression spring 132, ring poppet 134 contacts valve seat 138 and closes the normally open valve construction. With further build up in pressure in cavity 116, valve 58 banks out against stop 191. The extended reduced section 136 of valve 58 is provided with a counterbore into which the roll pin 162 is inserted and the plunger 160 is similarly connected to the roll pin 162. Thus the valve 58 and plunger 160 are firmly fixed together. With the valve 58 forced to the rightward position to close on valve seat 138, indicator lever 60 is rotated in counterclockwise direction by plunger 160 and a green signal is displayed through window 146.

With pressure applied to port 34, air is also free to flow through passageway 132 and into diaphragm cavity 130 which is also pressurized. Diaphragm 128 is positively fixed to plunger 164 which is provided with an enlarged section or head 174 which serves as a diaphragm shoe. It is also internally threaded to receive locking nut 176. Therefore, in assembly, locking nut 176 holds washer 180, plunger 164 and diaphragm 128 in tightly fixed subassembly which also forms a pocket for ring seal 187. The extended reduced section of plunger 164 is provided with an external groove which serves as a retainer for ring seal 188 which prevents leakage of air from diaphragm cavity 130 while ring seal 187 prevents loss of air from diaphragm cavity 124.

Diaphragm cavity 130 is pressurized through passageway 132 to overcome return spring 172 and to force diaphragm 128 and plunger 164 away from latching lever 156 and against the end wall 124' of cavity 124. If desired grooves or fluting 181 may be provided to maintain free fluid connection between cavity ports 124 and 142. Diaphragm cavity 124 is in direction communication with control port 42. With plunger 164 retracted, latching lever 156 is permitted to rotate counterclockwise about pivot shaft 158 due to the force exerted by spring 150 so that the extended tongue 166 on indicator lever 60 is disengaged from the slot 168 in latching lever 156. Indicator plunger 160 is in its rightmost position and even though latching lever 156 is disengaged, the indicator lever 60 retains a green or safe signal as viewed through window 146. However, should a transmitter 22 be connneted to port 32 with a sufficient length of connection tubing to cause a delay in pressurization of cavity 116 while cavity 130 is more quickly pressurized, then a "flicker" or a temporary red signal would be displayed by the indicator 60 until the connecting tubing to transmitter is pressurized, as indicated in full and dotted lines in the lower unit 30' of FIGURE 2.

With port 42 connected into a safety system, such as shown in FIGURES 2–4 and is connected with the actuating diaphragm cavity 94 of the master relay 95 of such a system, pressure is supplied to control port 42 through the restrictor orifice 89 located in the safety system. As control port 42 becomes pressurized, and control port cavity 124 is likewise pressurized, the pressure on the opposite sides of diaphragm 128 is balanced. Return spring 172 then forces latching plunger 164 to engage latching lever 156 and to rotate it clockwise about pivot pin 158 until diaphragm shoe portion 174 banks out against the end wall 177 of cavity 130 in body section 112. At the same time, the tongue 166 on indicating lever 60 engages the slot 168 which is formed in latching lever 156 and a green or safe signal is displayed by indicator 60.

If a transmitter 22 connected at port 32 should become unsafe and vent, as in the upper controller 30 in FIGURE 4, cavity 116 would also be vented at transmitter 22, since restrictor orifice 88 is so sized as to prevent enough air flow through such orifice to maintain actuating pressure in cavity 116. The load spring 132 then forces valve means 58 and plunger 160 to retract leftward to open valve means 58 and to permit control air to flow from control port 42 to vent port 59 past valve means 58. This would vent the actuating cavity 94 of the master relay 95 of the safety system and stop the engine 20. Cavity 124 is also vented since control port 42 is supplied with a restricted flow of air from the orifice 89, FIGURE 4. Cavity 130 is still pressurized and causes plunger 164 to also retract leftwardly thus permitting latching lever 156 to rotate in a counterclockwise direction and disengaging the extended tongue 166 from slot 168 so that spring 150 rotates the indicating lever in a clockwise direction to indicate an unsafe or red signal, as shown in FIGURE 6 and in the upper controller indicator 30 of FIGURE 4.

However, the companion lower controller indicator or indicators 30' etc., in FIGURE 4, operates in a different manner while the upper controller indicator 30 is stopping the engine as described in the preceding paragraph. The lower controller 30' of FIGURE 4 will retain its indicator 60' in safe indicating position. This occurs because orifice 88 and check valve 106 and closed, safe transmitter 22' of lower controller 30' maintain air pressure in cavity 116 for a substantial period of time after upper controller 30 has stopped the engine and has vented the pressure air supply system back as far as master relay 95 and pulse relay 104 and the entire control air system.

The lower check valve 106 of FIGURE 4 leaks so slowly that the chamber 116 will be maintained pressurized long enough to maintain plunger 160 and indicator 60' in "safe" position while certain transient pressure changes occur adjacent diaphragm 128. The lower diaphragm 128 of FIGURE 4 may be momentarily moved leftward during the temporary unequal the shutdown depressurizing of the lower cavities 124 and 128 by lines 132 and 92'. However, the cavities 124 and 128 are quickly equally depressurized to atmospheric pressure respectively at upper vent 59 and port 98 of valve 95 long before any slow leak through lower check valve 106 can depressurize cavity 116 to any substantial degree. Hence, with lower cavities 124 and 130 equalized at atmospheric pressure lower plunger 164 is moved rightwardly by spring 172 of FIGURE 7 and will hold latch 156 and indicator 60' in latched safe condition even if lower chamber eventually is later depressurized by slow leakage of lower check valve 106.

When the lower cavity 116 is finally depressurized, the spring 172 keeps lower plunger 164 and lower latch lever 156 in latching position, and indicator 60' in safe position indefinitely. The operator can therefore determine by the positions of the indicators 60, 60', etc. which transmitter 22 and corresponding controller 30 caused the engine shutdown, and can repair the engine accordingly.

The operations of the embodiments of FIGURES 7, 8 and 9 have been previously described.

It is thus to be seen that a new, useful and unobvious system and method of control of a device to be controlled, such as an engine, have been provided.

Also new, useful and unobvious controller indicators and condition indicators and methods have been provided.

While the form of the invention now preferred has been disclosed as required by statute, other forms may be used, all coming within the scope of the claimed subject matter which follows.

What is claimed is:

1. A control means comprising: casing means having a supply port, a transmitter port, a vent port, a control port, a supply port cavity connected to said supply port, a transmitter port cavity connected to said transmitter port, a supply restrictor passageway controlling supply fluid flow from said supply port to said transmitter port, a vent port cavity connected to said vent port, a control port cavity connected to said control port; transmitter port pressure responsive means separating said transmitter port cavity and said vent port cavity; control port pressure responsive means separating said control port cavity and said supply port cavity; vent valve means operated mechanically by said transmitter port pressure responsive means and connecting and disconnecting said vent port cavity and said control cavity; an indicator; an indicator actuator operated mechanically by said vent valve means; an indicator latching means; and a latching means actuator operated in response to the positioning of said control port pressure responsive means.

2. A control means according to claim 1 having a second control means similar thereto with the supply ports and control ports of both of said control means connected to a fluid pressure system controlling a controlled device and with the transmitter ports of both of said control means connected to respective transmitters pressurizing and depressurizing said transmitter ports in response to desirable and undesirable conditions and with said latching means holding said indicators in their respective indicating positions which they have when one of said transmitters causes variation of the operation of said controlled device by said control means in response to an undesirable condition.

3. A control means comprising: casing means having a supply port, a transmitter port, a vent port, a control port, a supply port cavity connected to said supply port, a transmitter port cavity connected to said transmitter port, a supply restrictor passageway controlling supply fluid flow from said supply port to said transmitter port, a vent port cavity connected to said vent port, a control port cavity connected to said control port; transmitter port pressure responsive diaphragm separating said transmitter port cavity and said vent port cavity; a control port pressure responsive diaphragm separating said control port cavity and said supply port cavity; vent valve means operated mechanically by said transmitter port pressure responsive diaphragm and connecting and disconnecting said vent port cavity and said control cavity; an indicator, an indicator actuator operated mechanically by said vent valve means; an indicator latching means; and a latching means actuator operated in response to the positioning of said control port pressure responsive diaphragm.

4. A control means according to claim 3 having a second control means similar thereto with the supply ports and control ports of both of said control means connected to a fluid pressure system controlling a controlled device and with the transmitter ports of both of said control means connected to respective transmitters pressurizing and depressurizing said transmitter ports in response to desirable and undesirable conditions and with said latching means holding said indicators in their respective indicating positions which they have when one of said transmitters causes variation of the operation of said controlled device by said control means in response to an undesirable condition.

5. A control means according to claim 3 with spring means biasing said vent valve means to a position to connect said control port cavity and said vent port cavity when said transmitter port is vented.

6. A control means according to claim 3 with spring means biasing said control port pressure responsive diaphragm to produce an indicator latching action of said latching means.

7. A control means comprising: casing means having a supply port, a transmitter port, a vent port, a control port, a supply port cavity connected to said supply port, a transmitter port cavity connected to said transmitter port; a supply restrictor passageway controlling supply fluid flow from said supply port to said transmitter port, a vent port cavity connected to said vent port, a control port cavity connected to said control port; transmitter port pressure responsive means separating said transmitter port cavity and said vent port cavity; control port pressure responsive means separating said control port cavity and said supply port cavity; vent valve means operated by said transmitter port pressure responsive means and connecting and disconnecting said vent port cavity and said control cavity; an indicator, and indicator actuator operated in response to positioning of said vent valve means; an indicator latching means; and a latching means actuator operated in response to the positioning of said control port pressure responsive means.

8. A control means according to claim 7 having a second control means similar thereto with the supply ports and control ports of both of said control means connected to a fluid pressure system controlling a controlled device and with the transmitter ports of both of said control means connected to respective transmitters pressurizing and depressurizing said transmitter ports in response to desirable and undesirable conditions and with said latching means holding said indicators in their respective indicating positions which they have when one of said transmitters causes variation of the operation of said controlled device by said control means in response to an undesirable condition.

9. In combination: a flat casing first block having a supply port and a transmitter port and a transmitter port cavity on one first block side in fluid flow relationship and with a restrictor passageway controlling fluid flow from said supply port to said transmitter port and cavity; a flat casing second block secured to said first block and having a vent port cavity on one second block side adjacent said transmitter port cavity and having a control port cavity on the opposite second block side and having a vent port between said second block sides and connected to said vent port cavity and having a control port between said second block sides connected to said control port cavity; a first diaphragm held between said first and second blocks and separating said transmitter port cavity and vent port cavity and actuating a valve means connecting and disconnecting said control port cavity and said transmitter port cavity; a casing third block secured to said second block and having a supply port cavity adjacent said control port cavity on one third block side and with a passageway to said supply port through said first and second blocks and having an indicator lever with a desired signal and an undesired signal and a latching lever for said indicating lever secured to the opposite third block side; a second diaphragm held between said second and third blocks and separating said supply port cavity and said control port cavity; biasing means biasing said indicating lever to display said undesired signal and biasing said latching lever to unlatch said indicating lever; an indicator lever plunger connected to said valve means and pushing said indicator lever to display said desired signal; a latching lever plunger actuated by said second diaphragm and pushing said latching lever to latching position; first spring means biasing said first diaphragm toward said transmitter port cavity; and second spring means biasing said second diaphragm toward said supply port cavity.

10. In combination: a flat casing first block having a supply port and a transmitter port and a transmitter port cavity on one first block side in fluid flow relationship and with a restrictor passageway controlling fluid flow from said supply port to said transmitter port and cavity; a flat casing second block secured to said first block and having a vent port cavity on one second block side adjacent said transmitter port cavity and having a control port cavity on the opposite second block side and having a vent port between said second block sides and connected to said vent port cavity; a first diaphragm held between said first and second blocks and separating said transmitter port cavity and vent port cavity and actuating a valve means connecting and disconnecting said restricted supply port cavity and said transmitter port cavity; a casing third block secured to said second block and having an unrestricted supply port cavity adjacent said control port cavity on one third block side and with an unrestricted passageway to said supply port through said first and second blocks and having an indicator lever with a desired signal and an undesired signal and a latching fever for said indicating lever secured to the opposite third block side; a second diaphragm held between said second and third blocks and separating said control port cavity and said unrestricted supply port cavity; biasing means biasing said indicating lever to display said undesired signal and biasing said latching lever to unlatch said indicating lever; an indicator lever plunger connected to said valve means and pushing said indicator lever to display said desired signal; a latching lever plunger actuated by said second diaphragm and pushing said latching lever to latching position; first spring means biasing said first diaphragm toward said transmitter port cavity; and second spring means biasing said second diaphragm toward said unrestricted port cavity.

11. In combination: a flat casing first block having a first supply port and a transmitter port and a transmitter port cavity on one first block side in fluid flow relationship and with a restrictor passageway controlling fluid flow from said first supply port to said transmitter port and cavity; a flat casing second block secured to said first block and having a vent port cavity on one second block side adjacent said transmitter port cavity and having a control port cavity on the opposite second block side and having a vent port between said second block sides and connected to said vent port cavity and having a control port between said second block sides connected to said control port cavity; a first diaphragm held between said first and second blocks and separating said transmitter port cavity and vent port cavity and actuating a valve means connecting and disconnecting said control port cavity and said transmitter port cavity; a casing third block secured to said second block and having a second supply port cavity adjacent said control port cavity on one third block side and with a passageway in said third block to a second supply port in said third block and having an indicator lever with a desired signal and an undesired signal and a latching lever for said indicating lever secured to the opposite third block side; a second diaphragm held between said second and third blocks and separating said supply port cavity and said control port cavity; biasing means biasing said indicating lever to display said undesired signal and biasing said latching lever to unlatch said indicating lever; a manual reset means pushing said indicator lever to display said desired signal; a latching lever plunger actuated by said second diaphragm and pushing said latching lever to latching position; first spring means biasing said first diaphragm toward said transmitter port cavity; and second spring means biasing said second diaphragm toward said second supply port cavity.

12. In combination: a flat casing first block having a first supply port and a transmitter port and a transmitter port cavity on one first block side in fluid flow relationship and with a restrictor passageway controlling fluid flow from said first supply port to said transmitter port and cavity; a casing second block secured to said first block and having a second supply port cavity adjacent said transmitter port cavity on one second block side and with a passageway in said second block to a second supply port in said second block and having an indicator lever with a desired signal and an undesired signal and a latching lever for said indicating lever secured to the opposite second block side; a diaphragm held between said blocks and separating said first supply port cavity and said second supply port cavity; biasing means biasing said indicating lever to display said undesired signal and biasing said latching lever to unlatch said indicating lever; a manual reset means pushing said indicator lever to display said desired signal; a latching lever plunger actuated by said diaphragm and pushing said latching lever to latching position; spring means biasing said diaphragm toward said second supply port.

13. A control means comprising: a casing means having a pressure fluid supply port, a transmitter port to be vented and unvented by a transmitter, vent means, and a control port; a fluid supply restrictor providing restricted flow of pressure fluid from said supply port to said transmitter port; a first diaphragm movable in response to differences in fluid pressures between said transmitter port and said vent means caused by the venting and unventing of said transmitter port; vent valve means moved by said first diaphragm to connect and vent and to disconnect and unvent said control port to and from said vent means; a second diaphragm movable in response to differences in fluid pressures between said supply port and said control port; an indicator moved by pushing action to a first indication by said first diaphragm and released to return to a second indication by spring action; and an indicator latch means moved by pushing action of said second diaphragm to latch said indicator in said first indication and released to return to unlatch said indicator by spring action.

14. A control means according to claim 13 having a lost motion connection between said indicator and said first diaphragm effective to move said indicator to latched position but ineffective to move said indicator from latched position when said indicator is latched by said latch means.

15. A control means according to claim 14 having a first spring means biasing said first diaphragm and vent valve means to control port vented position, and having a second spring means biasing said second diaphragm said latch means to indicator latching position.

16. A control means comprising: control and indicating means having a pressure fluid supply port, a transmitter port to be vented and unvented by a transmitter, vent means, and a control port; a fluid supply restrictor providing restricted flow of pressure fluid from said supply port in said transmitter port; a first diaphragm movable in response to the venting and unventing of said transmitter port; vent valve means moved by said first diaphragm to connect and vent and to disconnect and unvent said control port to and from said vent means; a second diaphragm movable in response to the venting and unventing of said control port; an indicator moved by pushing action to a first indication by said first diaphragm and released to return to a second indication by spring action; an indicator latch means moved by pushing action of said second diaphragm to latch said indicator in said first indication and released to return to unlatch said indicator by spring action.

17. A control means according to claim 16 having a lost motion connection between said indicator and said first diaphragm effective to move said indicator to latched position but ineffective to move said indicator from latched position when said indicator is latched by said latch means.

18. A control means according to claim 17 having a first spring means biasing said first diaphragm and said vent valve means to control port vented position, and having a second spring means biasing said second diaphragm and said latch means to indicator latching position.

19. A control means according to claim 16 having a second control means similar to said first named control means with the supply ports and control ports of both of said control means connected to a fluid pressure system controlling a controlled device and with the transmitter ports of both of said control means connected to respective transmitters venting and unventing said respective transmitter ports in response respectively to undesirable and desirable variations of respective conditions produced by the operation of said device and with one of said latch means maintaining the latching its respective indicator in said first indication while the other of said latch means releases its respective indicator to said second indication when its respective transmitter senses an undesirable variation of its respective condition of said controlled device and causes an appropriate change in the operation of said controlled device.

20. A control means according to claim 19 having a fluid pressure system with a common pressure fluid supply and capable of supplying substantially unrestricted pressure fluid to said supply ports and orifice restricted pressure fluid to said control ports, and having respective check valves for said respective control ports checking fluid flow away from said respective control ports, and permitting substantially unchecked fluid flow to said respective control ports.

21. A control and indicating means having a pressure fluid supply port, a transmitter port to be vented and unvented by a transmitter, vent means, and a control port, a first diaphragm movable in response to the venting and unventing of said transmitter port, a second diaphragm movable in response to the venting and unventing of said control port, an indicator moved by said first diaphragm and released by said first diaphragm to return to a second indication by spring action, and an indicator latch means moved by said second diaphragm to latch said indicator in said first indication and to unlatch said indicator for return to said second indication.

References Cited by the Examiner

UNITED STATES PATENTS

| 2,192,224 | 3/1940 | Forsberg | 116—114.26 X |
| 3,129,722 | 4/1964 | Wagner | 137—557 |

M. CARY NELSON, *Primary Examiner.*

H. KLINKSIEK, *Assistant Examiner.*